Sept. 21, 1971 R. H. MURRAY 3,606,690
TEST CORRECTING AND SCORING DEVICE
Filed July 18, 1969 6 Sheets-Sheet 1
Fig. 1
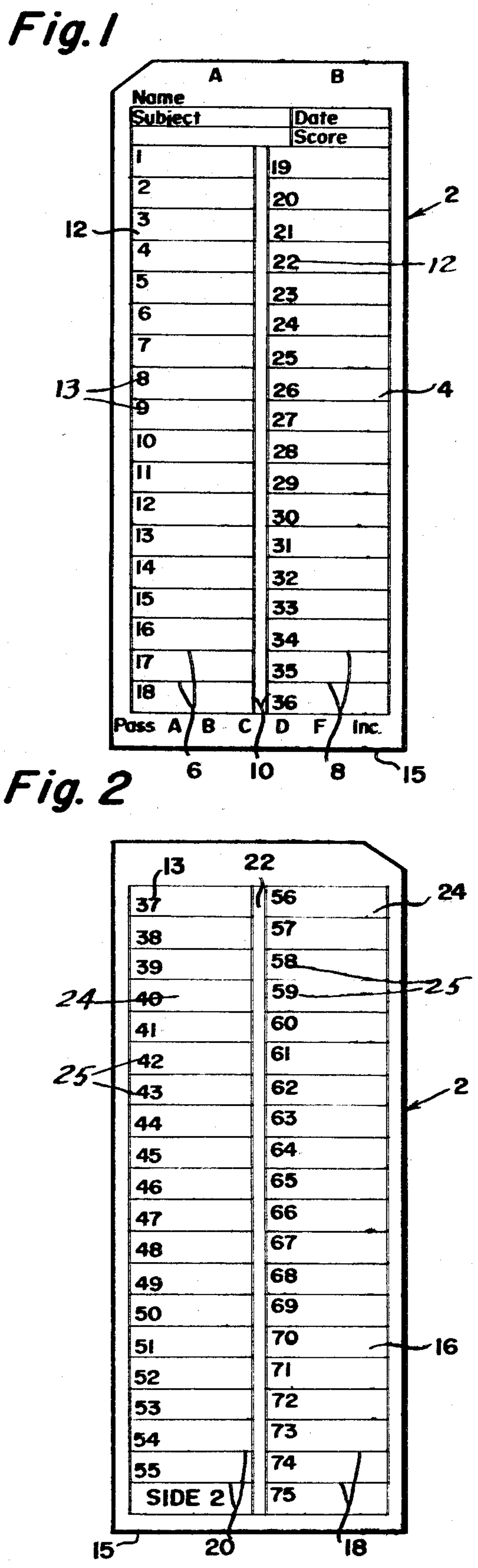
Fig. 1, Fig. 2
Fig. 3
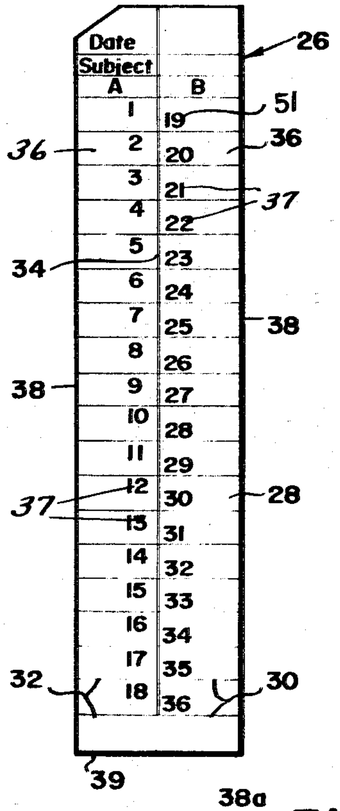
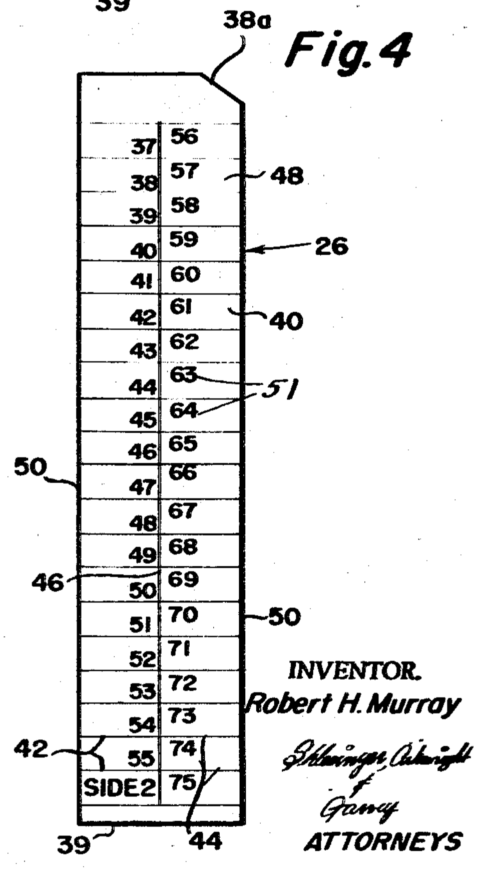
Fig. 4
INVENTOR.
Robert H. Murray
ATTORNEYS Sept. 21, 1971 R. H. MURRAY 3,606,690

TEST CORRECTING AND SCORING DEVICE

Filed July 18, 1969 6 Sheets-Sheet 2

INVENTOR.
ROBERT H. MURRAY

BY

ATTORNEYS

TEST CORRECTING AND SCORING DEVICE

Filed July 18, 1969 6 Sheets-Sheet 3

INVENTOR.
Robert H. Murray

ATTORNEYS

Sept. 21, 1971 R. H. MURRAY 3,606,690

TEST CORRECTING AND SCORING DEVICE

Filed July 18, 1969 6 Sheets-Sheet 4

INVENTOR.
Robert H. Murray

Ellsinger, Ackwright & ...
ATTORNEYS

TEST CORRECTING AND SCORING DEVICE

Filed July 18, 1969 6 Sheets-Sheet 5

INVENTOR.
Robert H. Murray

BY

ATTORNEYS

Sept. 21, 1971 R. H. MURRAY 3,606,690

TEST CORRECTING AND SCORING DEVICE

Filed July 18, 1969 6 Sheets-Sheet 6

INVENTOR.
Robert H. Murray
BY
ATTORNEYS

United States Patent Office 3,606,690
Patented Sept. 21, 1971

3,606,690

TEST CORRECTING AND SCORING DEVICE

Robert H. Murray, 800 North West St., Alexandria, Va. 22314

Filed July 18, 1969, Ser. No. 842,922
Int. Cl. G09b 3/00
U.S. Cl. 35—48A 19 Claims

ABSTRACT OF THE DISCLOSURE

A test scoring device comprising an answer card and a grading card; one of the cards overlying the other of the cards; one of the cards being larger in width than the other of the cards; including a guide line on one of the cards for longitudinally positioning the other of the cards thereon; the other of the cards when underlying the one of the cards having a margin extending beyond at least one of the side edges on the one of the cards; the cards including horizontal aligning means for cooperatively horizontally aligning the one of the cards with the other of the cards; the aligning means including parallel lines on at least one of the cards coinciding with the parallel lines on the other card.

GENERAL STATEMENT

This invention relates to an improved test scoring device over the prior art. In the past the accuracy of test scoring devices was hampered by the possibility of misalignment between the answer card and the grading card. Further, prior test scoring devices had a limited range of utility in the number of tests which could be graded by any one set of answer cards and grading cards. This improved test scoring device overcomes these problems in a simply constructed device requiring no extraordinary skills on the grader's part. This device is capable of assuring proper alignment between both the answer card and the grading card thereby eliminating any misalignment.

OBJECTS AND SUMMARY

It is an object of this invention to provide an inexpensive test scoring device of simple construction.

It is an object of this invention to provide a test scoring device having wide use in the field of education.

It is a further object of this invention to provide a test scoring device which assures proper alignment between the parts.

It is also an object of this invention to provide a test scoring device where one card overlies the other card.

It is an object of this invention to provide a test scoring device having indicia having individual characteristics, such as, different coloring.

It is an object of this invention to provide a test scoring device having vertical and horizontal guide lines.

It is also an object of this invention to provide a test scoring device having at least one grading card and one answer card.

It is an object of this invention to provide a test scoring device having a grading card and answer card which are identical.

It is a further object of this invention to provide a test scoring device having an answer card with plural faces and a grading card with plural faces to coincide with the faces of the answer card.

It is an object of this invention to provide a test scoring device having a slide support for the answer cards.

It is an object of this invention to provide a test scoring device which can be used to give multiple tests.

It is an object of this invention to provide a test scoring device having tally squares.

It is an object of this invention to provide a test scoring device where one card is wider than the other.

It is an object of this invention to provide a test scoring device which eliminates the possibility of error while providing ease of munipulation of the card.

In summary, this invention deals with a device for scoring tests whereby the possibility of error by improperly aligning an answering card with a grading card has been eliminated, and wherein there is also provided a simple relationship between the cards without complicating the grading procedure.

These and other objects of this invention will be apparent from the following description and claims:

In the accompanying drawings which illustrate by way of example various embodiments of this invention:

FIG. 1 is a plan view of this invention showing one side of the answer card;

FIG. 2 is a plan view of the other side of the answer card illustrated in FIG. 1;

FIG. 3 is a plan view of one side of a grading card which coincides with the side of the answering card illustrated in FIG. 1;

FIG. 4 is a plan view of the other side of the grading card illustrated in FIG. 3 and coinciding with the side of the answering card illustrated in FIG. 2;

Figures 11, 12, 13:
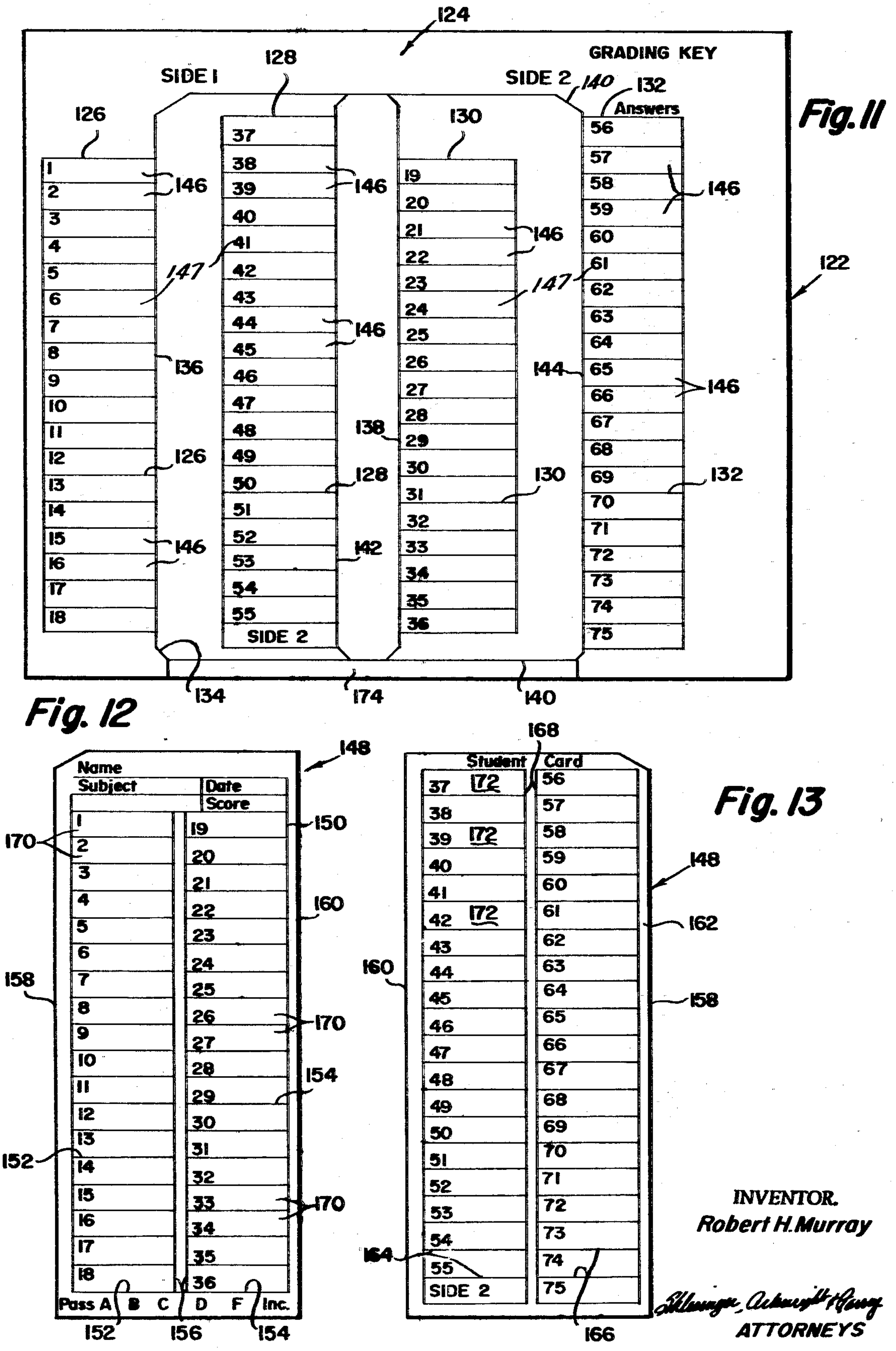
FIG. 11 is a plan view of another embodiment of this invention showing a grading card wherein the series of lines are interdigitated and alternate series of lines are in alignment.
Figure 14:
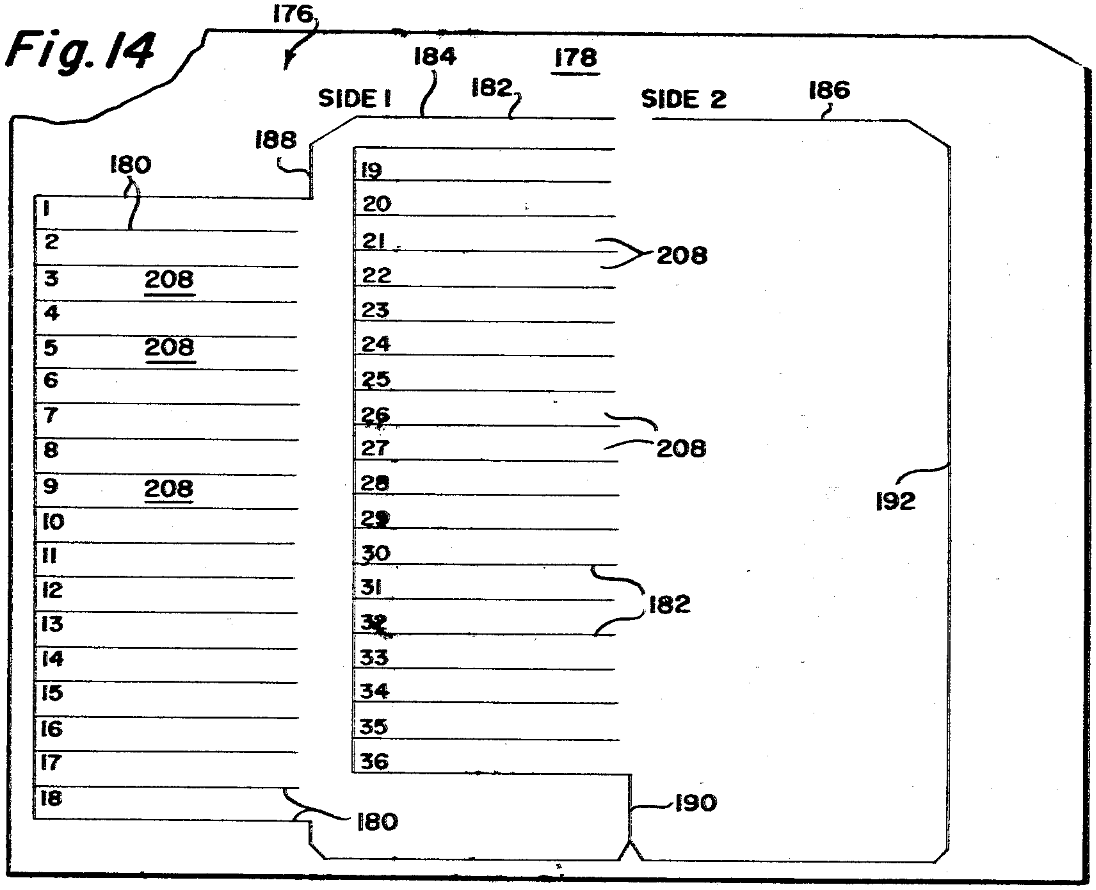
Figure 15:
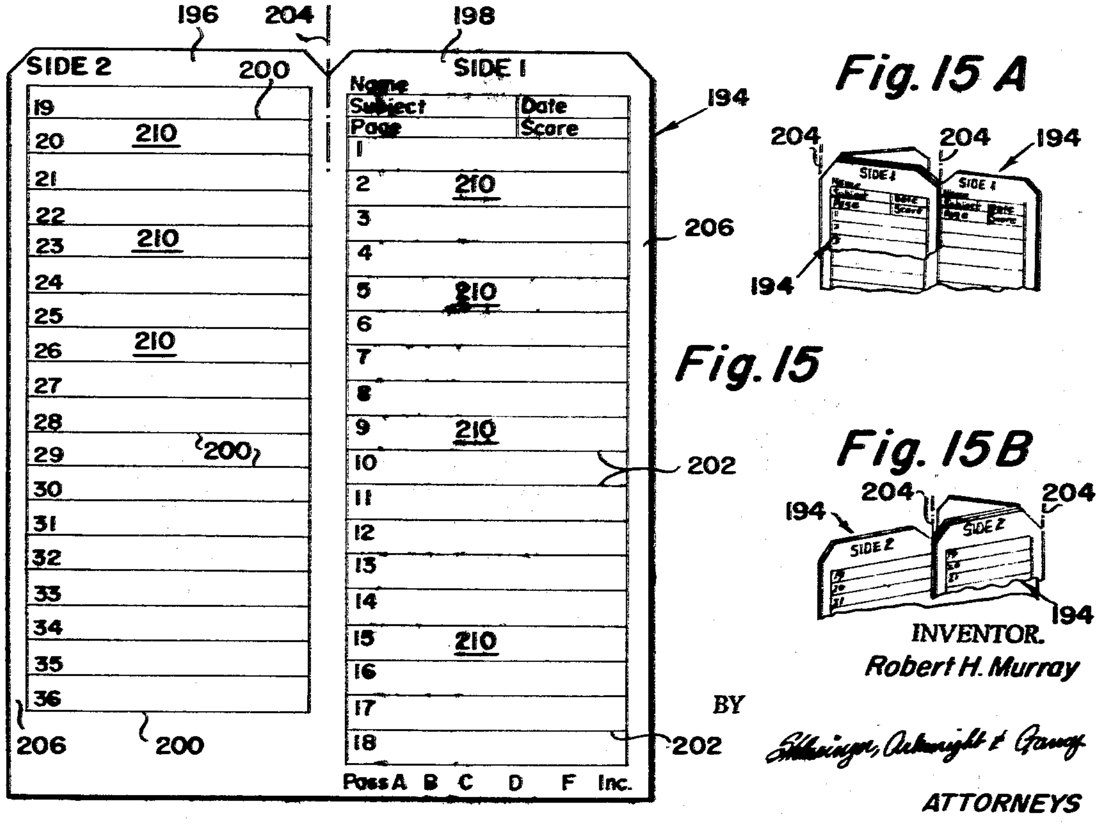
Figure 16:
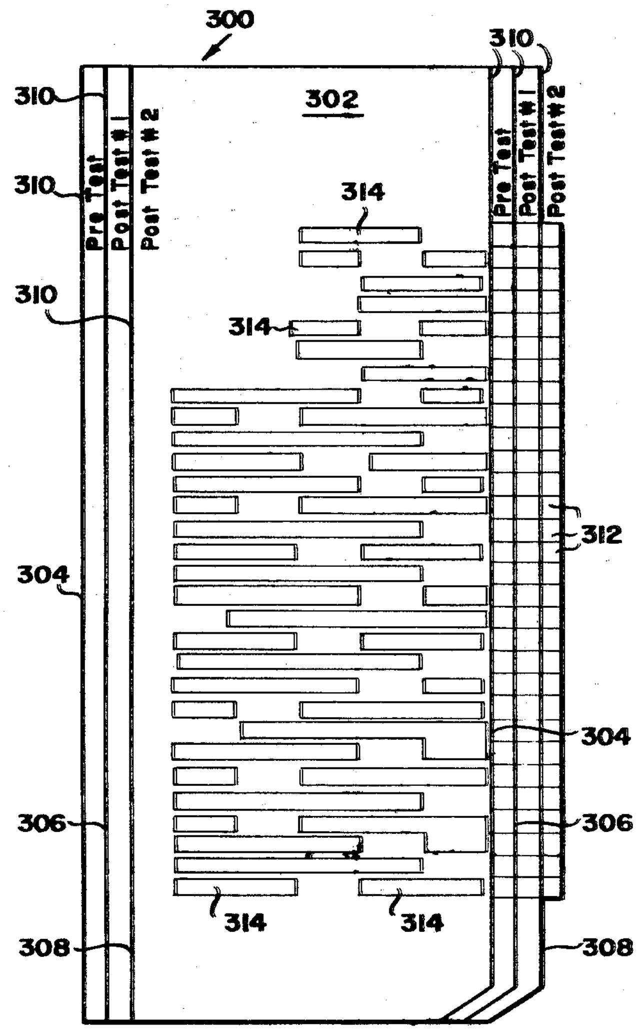
Figure 17:
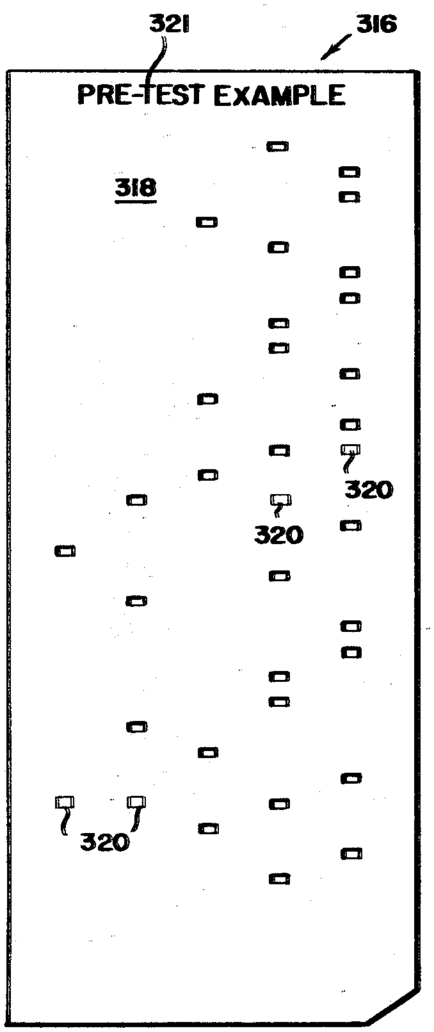

FIG. 11–A is a fragmentary perspective view illustrating in detail the support guide member in folded up position;

FIG. 12 is a plan view of one face of an answer card which coincides with the interdigitated series of lines in the grading card illustrated in FIG. 11;

FIG. 13 is a plan view of the other face of the answering card illustrated in FIG. 12 and wherein it coincides with the other interdigitated series of lines of the grading card illustrated in FIG. 11;

FIG. 14 is a plan view of another embodiment of this invention showing a grading card having both series of lines to one side of the card;

FIG. 15 is a plan view of another embodiment of an answer card having a fold line to form front and back sides and wherein the series of lines on one side are misaligned with the series of lines on the other side so that one series of lines will coincide with a series of lines on the grading card illustrated in FIG. 14 and the other series of lines will coincide with the other series of lines of the grading card in FIG. 14;

FIGS. 15–A and 15–B are fragmentary perspective views showing still another embodiment of this invention;

FIG. 16 is a plan view of another embodiment of a grading card for grading a plurality of answering cards;

FIG. 17 is a plan view of another embodiment of an answering card to be used with the grading card of FIG. 16.

FIGURES 1 THRU 4

The answer card 2 disclosed in FIG. 1 includes a face or side 4 and two horizontal guide line series 6 and 8 divided by vertical guide lines 10, thereby forming blocks 12. The blocks 12 may be appropriately marked with indicia 13, such as, consecutive numbers or letters. The answer card 2, shown in FIG. 2, includes a bottom edge 15 and a face or side 16 having two horizontal guide line series 18 and 20 divided by vertical guide lines 22 which form a plurality of blocks 24. Blocks 24 may be appropriately marked with indicia 25 continuing the numbers or letters from face 4. The horizontal line series 6 and 8 on face 4 are misaligned with the two horizontal line series 18 and 20 on face 16.

The grading card 26, FIG. 3, is smaller in width than answer card 2 and has a face 28 which is divided into two horizontal guide line series 30 and 32 by a vertical dividing line 34 forming blocks 36. The blocks 36 include indicia 37 which correspond with indicia 13 on blocks 12. The grading card has side edges 38 and bottom edge 39 which are used to align the card with vertical guide lines 10 and bottom edge 15 of the answer card 2. FIG. 4 shows the other face 40 of the grading card 26 divided into horizontal line series 42 and 44 by a vertical dividing line 46 forming blocks 48. One of side edges 50 aligns with vertical guide lines 22 of the answer card 2, shown in FIG. 2. The horizontal guide lines 30 and 32 of face 28 are offset with horizontal guide lines 42 and 44 of face 40 preventing misalignment with the answer card 2. The blocks 48 have appropriate indicia 51 such as numbers or letters to correspond with the indicia 25 on blocks 24 of the answer card 2.

OPERATION

In use, a pupil would enter his answers from a given test in the appropriately marked blocks 12 or 24 of the answer card 2. The answer would then be compared to the correct answer recorded in the appropriate block of the grading card 26. To compare the answers, the grading card 26 is placed on the answer card 2 in such a manner that vertical guide lines 10 of the answer card 2 are in alignment with the appropriate side edge 38 of the grading card 26 and bottom edge 15 of the answer card 2 is in alignment with the bottom edge 39 of the grading card 26. The exposed portion of the answer card 2 forms a margin containing blocks 12, having the student's answers to be compared with coinciding blocks 36 of the grading card 26. To grade the pupil's answers in blocks 12 of horizontal guide line series 6, covered by the grading card 26, the grading card 26 is shifted to the right exposing horizontal guide line series 6 of the answer card 2 aligning the horizontal bottom edge 15 with horizontal bottom edge 39 of the grading card 26 and aligning vertical guide lines 10 with the appropriate side edge 38. The procedure is repeated for the face 16 of the answer card 2 comparing the answers thereon with the correct answers on face 40 of the grading card 26. Since the lines on face 4 are offset in relation to the lines on face 16 of the answer card 2 and since the lines of face 28 are offset in relation to the lines on face 40 of the grading card 26 it will be difficult for the teacher to align face 28 of the grading card with face 16 of the answer card 2 or face 40 of the grading card 26 with face 4 of the answer card 2.

FIGURES 5 THRU 8

Figure 5:
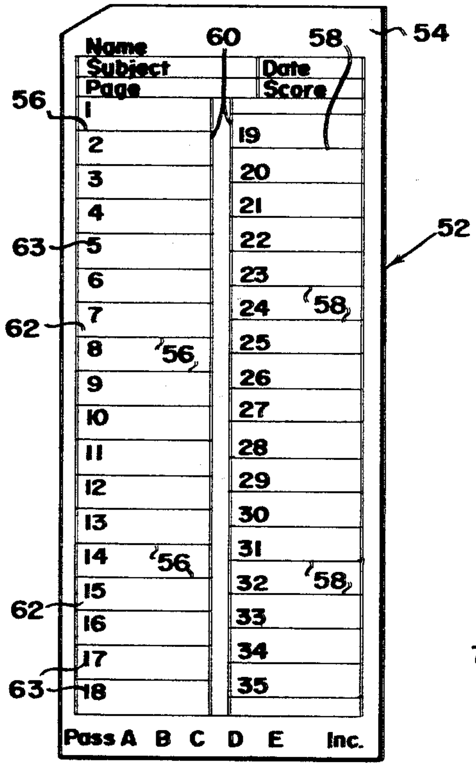
FIG. 5 is a plan view of another embodiment of an answering card.

The embodiment shown in FIG. 5 shows an answer card 52 including a face 54 which is divided into two horizontal guide line series 56 and 58 by vertical guide lines 60, forming blocks 62. Blocks 62 may have indicia 63, such as, numbers or letters.

Figure 6:
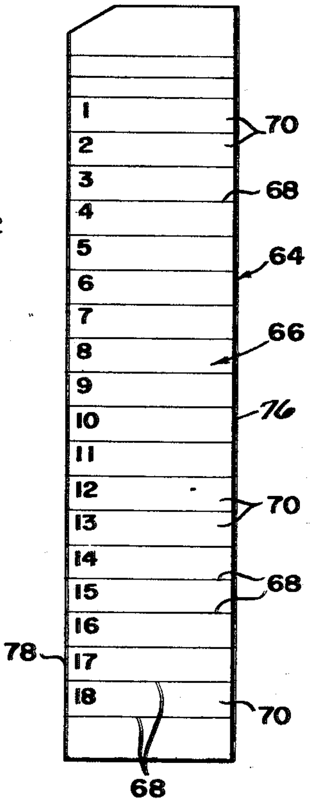
FIG. 6 is a plan view of another embodiment of one face of a grading card which coincides with the face of the answering card illustrated in FIG. 5.
Figure 7:
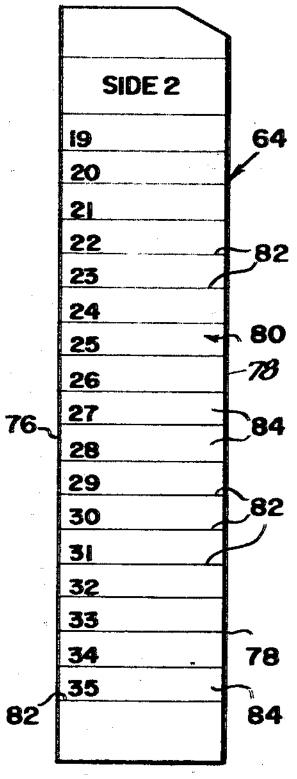
FIG. 7 is a plan view of the other side of the grading card illustrated in FIG. 6.
Figure 7:
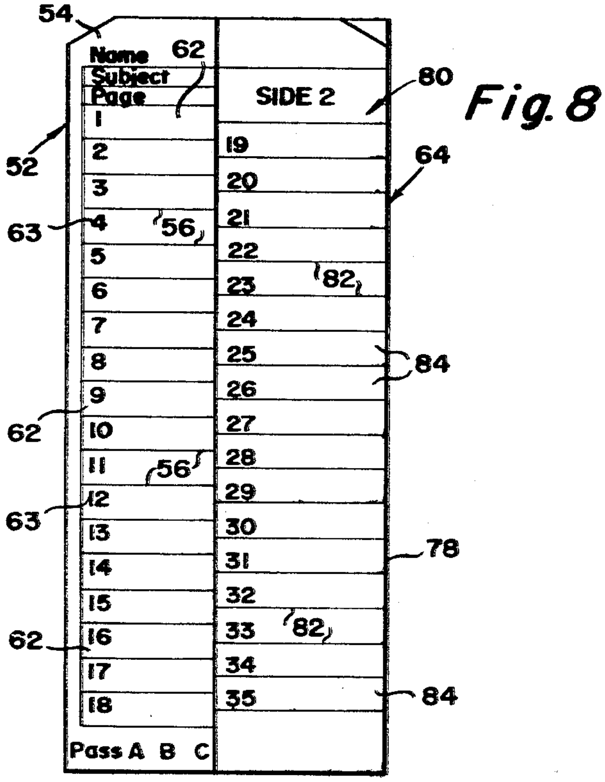

FIG. 6 shows a grading card 64 which is smaller in width than answer card 52 having a face 66 divided into horizontal guide line series 68 forming blocks 70. The grading card 64 has side edges 76 and 78 which serve as aligning means to coincide with the appropriate one of the line vertical guide 60 of the answer card 52. FIG. 7 shows face 80 of the grading card 64 having horizontal guide line series 82 forming blocks 84. Blocks 70 on face 66 are misaligned with blocks 84 on face 80.

Figure 8:
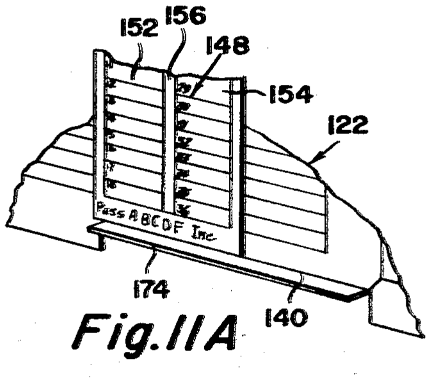
FIG. 8 shows misalignment between the answering card illustrated in FIG. 5 and the face of the grading card illustrated in FIG. 7.

The use of the answer card 52 and grading card 64 is similar to that described for answer card 2 and grading card 26, with the exception that answer card 52 has one usable face. This face 52 is shown in FIG. 8 with face 80 of grading card 64 shown overlying it. The arrangement of face 80 of the grading card on face 54 of the answer card 52 shows the misalignment between the two and the impossibility of error in matching the wrong face of the grading card 64 with the answer card 52.

FIGURES 9 AND 10

Figure 9:
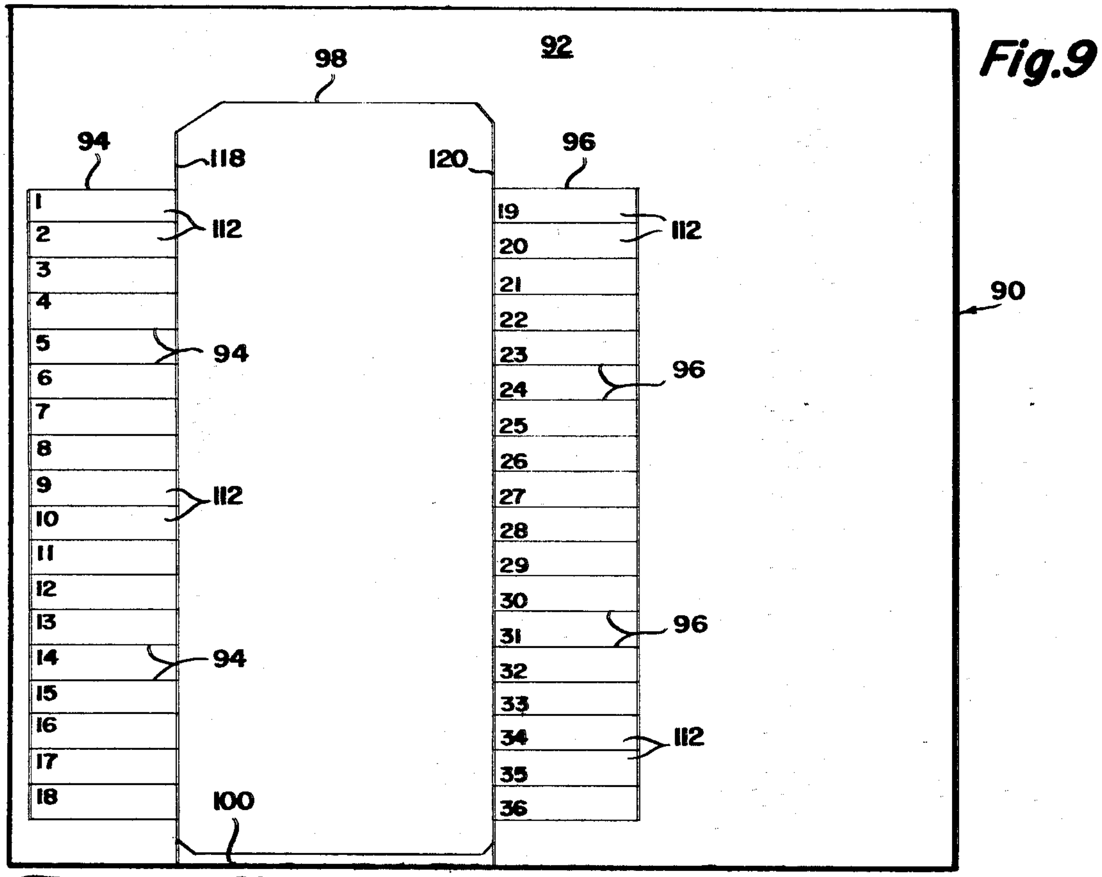
FIG. 9 shows a plan view of another embodiment of the invention wherein the two series of lines on the grading card are separated by the outline of the answering card.

In FIG. 9, the grading card 90 has a face 92 showing two horizontal guide line series 94 and 96 separated by the outline 98 of an answer card. The bottom edge of the grading card 90 below the outline of the answer card has an integral upturned flap 100 which supports the answer card 102 similar to the embodiment shown in FIG. 11–A when folded upright along a score line (not shown).

Figure 10:
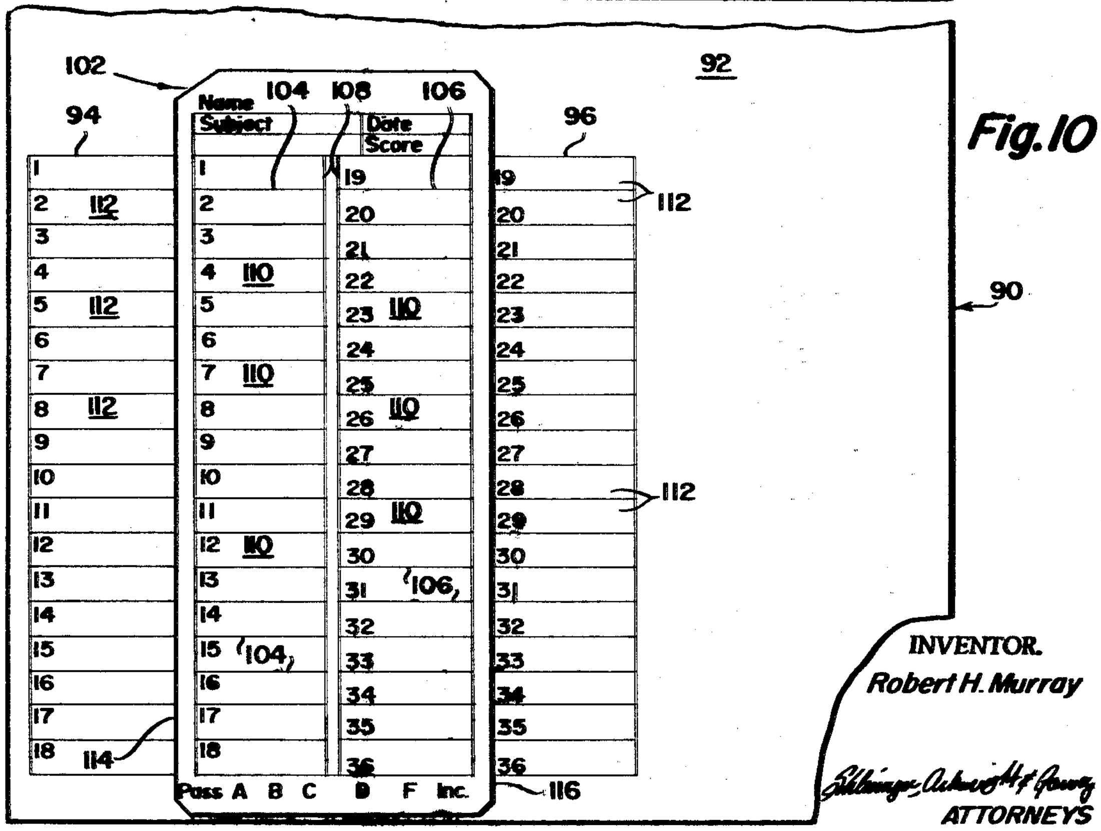
FIG. 10 is a plan view of another embodiment of the answering card illustrated in FIG. 9 and wherein an answering card is in proper alignment with the series of lines on the grading card.

FIG. 10 shows an answer card 102 smaller in width than grading card 90, positioned in the outline 98. Horizontal guide line series 104 coincides with horizontal guide line series 94 of the grading card 90 and horizontal guide line series 106 coincides with horizontal guide line series 96 of the grading card 90. Horizontal guide line series 104 and 106 are divided by vertical dividing lines 108, forming blocks 110. The answer card 102 has side edges 114 and 116.

OPERATION

In use, the pupil writes his answers to a given test in blocks 110 of the answer card 102. To compare the correct answers written in blocks 112 on the grading card 90 with the pupil's answers in blocks 110 of the answer card 102, the answer card 102 is placed in the outline 98 so that side edges 114 and 116 align with vertical guide lines 118 and 120, and horizontal guide line series 104 and 106 of the answer card 102 align with horizontal guide line series 94 and 96 of the grading card 90. The answer card 102 is supported by guide flap 100.

FIGURES 11 THRU 13

The grading card 122, shown in FIGS. 11 and 11–A includes a face 124 divided into four horizontal guide line series 126, 128, 130 and 132. The horizontal guide line series are interdigitated where series 126 is horizontally aligned with series 130 and series 128 is horizontally aligned with series 132. The space between the two series 126 and 130 forms an outline 134 of one side of an answer card having parallel vertical guide lines 136 and 138. The space between series 128 and 132 forms an outline 140 of the other side of the answer card, having parallel vertical guide lines 142 and 144. The blocks 146 have indicia 147 which can be numbers or letters.

FIG. 12 discloses an answer card 148, smaller in width than grading card 122, having a face 150 which is divided into horizontal guide line series 152 and 154 by vertical dividing lines 156. The answer card 148 has side edges 158 and 160 used for aligning over the grading card 122.

FIG. 13 shows obverse face 162 of answer card 148 having two horizontal line series 164 and 166 divided by vertical dividing lines 168.

Face 150, FIG. 12, shows blocks 170 and face 162, FIG. 13, shows blocks 172. The blocks 170 on face 150 are offset with respect to blocks 172 on face 162.

In use, the pupil records his answers in blocks 170 of the answer card 148, these answers are compared with the correct answers in blocks 146 of the grading card 122. To compare the two answers, answer card 148 with face 150 showing is placed in outline 134 so that side edge 158 aligns with vertical guide line 136 and side edge 160 aligns with vertical guide line 138, and horizontal guide lines 152 and 154 align with horizontal guide lines 126 and 130. After the answers have been compared, answer card 148 with face 162 showing is placed in outline 140 so that side edge 160 aligns with vertical guide line 142 and side edge 158 aligns with vertical guide line 144, and horizontal guide line series 164 and 166 align with horizontal guide line series 128 and 132. It can be seen that when the answer card 148 is placed in either outline 134 or 140 that a margin exists on either side of the card 148.

It may be desirable to have an integral upturned flap 174 forming a slide support at the bottom of the grading card 122 and in juxtaposition to the outlines 134 and 140 to support the answer card 148, as shown in FIG. 11–A.

FIGURES 14 THRU 15–B

FIG. 14 shows a grading therefore, card 176 including face 178 wherein the two horizontal guide line series 180 and 182 are to one side of the card 176. Face 178 further includes outlines 184 and 186 for an answer therefore card such as previously mentioned where the outlines 184 and 186 have parallel vertical guide lines 188, 190 and 192. The grading card 176 may be provided with an integral support flap (not shown).

FIG. 15 shows answer card 194, smaller in width than grading card 176, including faces 196 and 198 each face having a horizontal guide line series 200 and 202 respectively which are offset with each other. The answer card 194 is folded in two along center line 204.

In use, after the pupil has recorded his answers in blocks 210, the answer card 194 with face 196 showing is placed in outline 184 so that the side edges of the answer card 194 align with the vertical guide lines 188 and 190, and horizontal guide line series 200 aligns with horizontal guide line series 180 on the grading card 176 and the correct answers in blocks 208 on the grading card 176 are compared with the answers in blocks 210 of the answer card 194. The answer card 194 is then placed in outline 186 of the answer card 176 with face 198 showing, the side edges of the answer card 194 are aligned with vertical guide lline series 190 and 192, an dthe horizontal guide line series 202 of the answer card 194 are aligned with horizontal guide line series 182 of the grading card 176. The correct answers in blocks 208 of the grading card 176 are compared with the pupil's answers in blocks 210 of the answer card 194.

FIGURES 15–A AND 15–B

The card 194 shown in FIG. 15–A has been folded along line 204 to form a grading card upon which the instructor has written the correct answers in blocks 210. A second identical card 194 containing the student's answers in blocks 210 is inserted, without folding into the fold in said grading card. The bottom edges of both are aligned and the answers are compared. To score the other column of student answers the grading card 194 is removed and positioned over tthe opposite edge of the student's answer card as shown in FIG. 15–B.

FIGURES 16 AND 17

FIG. 16 shows a grading card 300 including a face 302. The face 302 is divided into outlines 304, 306 and 308 of an answer card, each outline having a pair of vertical parallel guide lines 310. Next to each outline and in close proximity to each outline is a series of tally squares 312.

The tally squares 312 are arranged in vertical sequence to align with horizontal markings 314. The markings 314 have individual characteristics which easily identify one marking from the next. This may be done by using a different color for each marking or some other identifying means such as different hatching and so forth.

FIG. 17 shows an answer card 316 which is smaller in width than grading card 300, including a face 318 which has a plurality of scored punch-outs 320.

In use, the student would record his answer on the answer card 316 by punching out one of the scored punch-outs 320. After the student has completed, for example, a Pre-test, the answer card 316 is placed on the Pre-test outline corresponding to the test given. The answer card 316 and the outline can be matched by proper identifying indicia 321 similar to that shown in the drawings. The answer card 316 is aligned with the proper outline and horizontal markings 314 and tally squares 312. In grading the test, the teacher would record the number of individual markings 314 showing through the punch-outs in the tally squares. A particular color of the markings 314 indicates a wrong answer when showing through the punch-outs. Another color showing would indicate a proper answer. Various other colorations or hatchings can obviously be used in similar manner. A subsequent test given at a later date, on the same subject matter as a previous test, can be graded with the same grading card 300 by placing the new answer card 316 in the proper outline, such as post test No. 1 and recording the answers in the tally squares 312 next to No. 1; further, a third test may be given on the same subject matter, using the same grading card and outline marked post test No. 2. In this way a teacher would be able to keep a running record of a pupil's learning ability.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and fall within the scope of this invention or have limits of the appended claims.

Having thus described my invention what I claim is:

1. A test scoring device comprising:

(a) an answer card having two faces, (b) a grading card having two faces, (c) one of said cards overlying the other of said cards, (d) one of said cards being larger in width than the other of said cards, (e) means on one of said cards for longitudinally positioning the other of said cards thereon including guide line means, (f) said other of said cards when underlying said one of said cards having a margin extending beyond at least one of the side edges of said one of said cards, (g) said cards including horizontal aligning means for cooperatively horizontally aligning said one of said cards with said other of said cards, (h) said aligning means including parallel lines on at least one of said cards and indicia means on the other of said cards coinciding with said parallel lines, (i) said indicia means comprising parallel lines on one of said faces, (j) said at least one of said cards having parallel lines on both of its faces, (k) the lines on one face of said at least one of said cards being misaligned with the lines on the other face of said at least one of said cards, (l) said other of said cards having a first series of lines coincident with the lines on said one of the faces of said at least one of said cards, and (m) said other of said cards has a second series of lines coincident with the lines on said other of the faces of said at least one of said cards.

2. A test scoring device as in claim 1 and wherein:
(a) said overlying card is smaller in surface area than said underlying card.

3. A test scoring device as in claim 2 and wherein:
(a) both of said cards are divided longitudinally on one face by a vertical dividing line.

4. A test scoring device as in claim 2 and wherein:
(a) at least one of said cards is divided longitudinally on one face by a vertical dividing line.

5. A test scoring device as in claim 2 and wherein:
(a) at least one of said cards is divided longitudinally on both faces by a vertical dividing line.

6. A test scoring device as in claim 2 and wherein:
(a) both of said cards are divided longitudinally on both faces by a vertical dividing line.

7. A test scoring device as in claim 6 and wherein:
(a) both of said cards have parallel lines on both faces.

8. A test scoring device as in claim 2 and wherein:
(a) said underlying card has a slide support means for said overlying card.

9. A test scoring device as in claim 8 and wherein:
(a) said slide support means is positioned at the bottom of said underlying card.

10. A test scoring device as in claim 9 and wherein:
(a) said slide support means is an integral upturned flap.

11. A test scoring device as in claim 1 and wherein:
(a) said first and second series of lines of said other of said cards are on the same face of said other of said cards.

12. A test scoring device as in claim 11 and wherein:
(a) both of said cards include a vertical dividing line on both faces of each of said cards.

13. A test scoring device as in claim 1 and wherein:
(a) said first series of lines is one one face of said other of said cards, and
(b) said second series of lines is on the other face of said other of said cards.

14. A test scoring device as in claim 13 and wherein:
(a) both of said cards include a vertical dividing line on both faces of each of said cards.

15. A test scoring device as in claim 1 and wherein:
(a) said aligning means including the outline of said overlying card, and
(b) said aligning means is positioned outside of said outline.

16. A test scoring device as in claim 1 and including:
(a) a third and fourth series of lines on said other of said cards,
(b) said first and third series and said second and fourth series being interdigitated, and
(c) said first and third series being misaligned with said second and fourth series.

17. A test scoring device as in claim 1 and wherein:
(a) said first and second series of lines of said other of said cards are substantially on one side of one face of said other of said cards.

18. A test scoring device as in claim 1 and wherein:
(a) said overlying card is one-half the width of said underlying card.

19. A test scoring device comprising:
(a) an answer card having two faces,
(b) a grading card having two faces,
(c) one of said cards overlying the other of said cards,
(d) means on one of said cards for longitudinally positioning the other of said cards thereon including guide line means,
(e) said other of said cards when underlying said one of said cards having a margin extending beyond at least one of the side edges of said one of said cards,
(f) said cards including horizontal aligning means for cooperatively horizontally aligning said one of said cards with the other of said cards,
(g) said aligning means including parallel lines on at least one of said cards and indicia means on the other of said cards coinciding with said parallel lines,
(h) said indicia means comprising parallel lines on one of said faces,
(i) at least one of said cards having parallel lines on both of its faces,
(j) the lines on one face of said at least one of said cards are misaligned with the lines on the other face of said at least one of said cards,
(k) said other of said cards having a first series of lines coincident with the lines on said one of the faces of said at least one of said cards, and
(l) said other of said cards having a second series of lines coincident with the lines on said other of the faces of said at least one of said cards.

References Cited

UNITED STATES PATENTS

| | | | |
|---|---|---|---|
| 909,477 | 1/1909 | Thompson | 35—48 |
| 1,151,171 | 8/1915 | Fassett | 35—48 |
| 1,436,997 | 11/1922 | McDade | 35—48 |
| 1,673,166 | 6/1928 | Studebaker | 35—48 |
| 1,884,676 | 10/1932 | Hendrie | 35—48 |
| 1,915,653 | 6/1933 | Dutton | 35—48 |
| 2,422,491 | 6/1947 | Lorber | 35—48 |
| 3,279,099 | 10/1966 | Jansson | 35—48 |

ROBERT W. MITCHELL, Primary Examiner
J. H. WOLFF, Assistant Examiner